(12) United States Patent
Yu et al.

(10) Patent No.: US 9,826,144 B2
(45) Date of Patent: Nov. 21, 2017

(54) PERIPHERAL EQUIPMENT FOR CONTROLLING CAMERA ARRANGED IN A TERMINAL, SYSTEM AND METHOD THEREOF

(71) Applicant: LOOQ SYSTEM INC, Santa Clara, CA (US)

(72) Inventors: Woody Yu, Santa Clara, CA (US); Chi-Min Huang, Santa Clara, CA (US)

(73) Assignee: LOOQ SYSTEM INC, Santa Clara, CA (US)

( * ) Notice: Subject to any disclaimer, the term of this patent is extended or adjusted under 35 U.S.C. 154(b) by 0 days.

(21) Appl. No.: 14/247,773

(22) Filed: Apr. 8, 2014

(65) Prior Publication Data

US 2014/0313358 A1 Oct. 23, 2014

Related U.S. Application Data

(63) Continuation-in-part of application No. 14/174,945, filed on Feb. 7, 2014, now abandoned.

(30) Foreign Application Priority Data

Apr. 18, 2013 (CN) .......................... 201310136358.2
Jun. 3, 2013 (CN) .......................... 201310217058.7

(51) Int. Cl.
*H04N 5/232* (2006.01)

(52) U.S. Cl.
CPC ..... *H04N 5/23222* (2013.01); *H04N 5/23203* (2013.01)

(58) Field of Classification Search
CPC ........... H04N 5/23222; H04N 5/23203; G03B 17/561; G03B 17/563; G03B 17/5635
USPC ............. 348/211.2, 373, 376, 211.1, 211.99; 396/58, 59, 419–428
See application file for complete search history.

(56) References Cited

U.S. PATENT DOCUMENTS

| 4,219,268 A * | 8/1980 | Uchida | ................. F16M 11/32 396/428 |
| 4,530,580 A * | 7/1985 | Ueda | ..................... F16M 13/04 248/187.1 |
| 4,560,261 A * | 12/1985 | Ueda | .................... G03B 19/023 396/336 |
| 5,768,645 A * | 6/1998 | Kessler | ................. G03B 17/38 396/376 |
| 7,684,694 B2 * | 3/2010 | Fromm | ................. F16M 11/14 396/376 |

(Continued)

*Primary Examiner* — Lin Ye
*Assistant Examiner* — Chan Nguyen
(74) *Attorney, Agent, or Firm* — Ladas & Parry LLP

(57) ABSTRACT

The invention relates to the field of portable electronic equipment, and discloses peripheral equipment for controlling a camera arranged in a terminal, a system and a method thereof. The peripheral equipment comprises: an external controller, comprising a user operation end for receiving an operation action of a user; and a trigger signal generator for generating a regular trigger event signal according to the operation action; and a transmission device, comprising an interface interacting with the terminal, for transmitting the trigger event signal to the terminal through a transmission medium. According to the invention, the problem that existing mobile terminals with relatively large sizes are unfavorable for photo taking operation of users is effectively solved.

13 Claims, 11 Drawing Sheets

(56) References Cited

U.S. PATENT DOCUMENTS

| | | | | |
|---|---|---|---|---|
| 7,706,673 B1 | * | 4/2010 | Staudinger | F16M 11/06 348/211.2 |
| 8,002,480 B2 | * | 8/2011 | Polster | G03B 17/38 396/425 |
| D678,387 S | * | 3/2013 | Stump | D16/244 |
| D715,791 S | * | 10/2014 | Yu | D14/253 |
| 2008/0187308 A1 | * | 8/2008 | Hannan | G03B 17/00 396/425 |
| 2009/0003822 A1 | * | 1/2009 | Tyner | F16M 11/32 396/428 |
| 2009/0136058 A1 | * | 5/2009 | Choi | H04R 5/04 381/74 |
| 2013/0176412 A1 | * | 7/2013 | Chen | H04N 7/183 348/77 |

* cited by examiner

PERIPHERAL EQUIPMENT FOR CONTROLLING CAMERA ARRANGED IN A TERMINAL, SYSTEM AND METHOD THEREOF

RELATED APPLICATIONS

The present application claims priority to Chinese Patent Application No. 201310136358.2, titled "Photo Taking System for Controlling Camera arranged in a terminal through Peripheral Equipment, Method and Device thereof" filed on Apr. 18, 2013 with the State Intellectual Property Office of the People's Republic of China, Chinese Patent Application No. 201310217058.7, titled "Peripheral Equipment for Controlling Camera arranged in a terminal, System and Method Thereof" filed on Jun. 3, 2013 with the State Intellectual Property Office of the People's Republic of China, and the present application is also a continuation-in-part of the co-pending U.S. application Ser. No. 14/174,945, titled "Peripheral Equipment for Controlling Camera arranged in a terminal, System and Method Thereof" filed on Feb. 7, 2014, and all of which are fully incorporated herein by reference.

FIELD OF THE INVENTION

The invention relates to portable electronic equipment, and in particular relates to peripheral equipment for controlling a camera arranged in a terminal, a system and a method thereof.

BACKGROUND OF THE INVENTION

With the development of science and technology, mobile terminals as the most widely used terminals have been integrated into people's life. In addition to the basic call function, mobile terminals have various functions of mobile-computer type, particularly personal information management, and browser and e-mail functions based on wireless data communication. Mobile terminals provide users with enough screen size and bandwidth, thereby being convenient to carry around and also providing a broad stage for software running and content services, so that many value added services can be developed thereon, such as stocks, news, weather, transportation, commodities, application program downloading and music and picture downloading.

People can have overall business and entertainment experiences without carrying more electronic devices just because of the integration of the mobile terminal functions, for example, the music playing function of a mobile terminal can replace that of an MP3, the photo taking function of the mobile terminal can replace that of a camera, etc. Furthermore, with the development of the mobile technology, various mobile terminal manufactures are also continuously upgrading hardware configuration of mobile terminals, therefore, the functionality and practicality of the mobile terminals are greatly improved.

Currently, photo taking by mobile terminal has been widely utilized; however, mobile terminals have various size dimensions, and especially those with relatively large sizes are not favorable for the photo taking operation of users. Meanwhile, the battery capacity may not meet the application requirements of mobile terminal. It may lead to emergency call or operation is interrupted when the battery capacity alarms. And the mobile terminal equipped with the LED may not achieve effective lighting because of limits of the arm length and the degree of freedom, such as in the nooks and crannies sheltered with the articles. Therefore, these have become urgent problems that mobile terminals with relatively large sizes are unfavorable for the photo taking operation of users, providing backup power to the mobile terminal, and solving the effective lighting limited by arm length and the degree of freedom to some extent.

SUMMARY OF THE INVENTION

(I) Technical Problem to be Solved

The technical problem to be solved by the invention is to provide peripheral equipment for controlling a camera arranged in a terminal, a system and a method thereof, in order to solve the problems that existing mobile terminals with relatively large sizes are unfavorable for photo taking operation of users, providing backup power to the mobile terminal, and solving the effective lighting limited by arm length and the degree of freedom to some extent.

(II) Technical Solution

To solve the above technical problem, on the one hand, the invention provides peripheral equipment for controlling a camera arranged in a terminal, characterized in that the peripheral equipment comprises:
an external controller, comprising a user operation end for receiving an operation action of a user; and a trigger signal generator for generating a regular trigger event signal according to the operation action; and
a transmission device, comprising an interface interacting with the terminal, for transmitting the trigger event signal to the terminal through a transmission medium.

Preferably, the user operation end comprises at least one of a key, a handle, a somatosensory controller and a touch pad.

Preferably, the trigger signal generator comprises at least one of a voltage/current signal generating element, an electromagnetic wave signal generator, an infrared signal generator, an optical signal generator, a gravity adjusting device and an audio signal generator.

Preferably, the interface interacting with the terminal comprises at least one of an earphone plug, a USB plug, a power plug, an infrared transmission interface, a bluetooth transmission interface, a WIFI transmission interface, a radio frequency transmission end, a speaker, an optical unit and a contact point with the terminal.

Preferably, the transmission medium comprises at least one of a wire, a rigid material for transmitting gravity, an optical fiber and air.

Preferably, the peripheral equipment further comprises a support and a terminal clamp, wherein
the upper end of the support is connected with the terminal clamp;
the terminal clamp comprises a size adjusting and clamping member for clamping and fixing the terminal, or terminals with different sizes.

Preferably, the upper end of the support is flexibly connected with the terminal clamp through a universal ball joint, so as to perform multidirectional adjustment of the terminal clamp.

Preferably, the universal ball joint is arranged at the upper end of the support, and the lower end of the terminal clamp is provided with a ball joint seat for accommodating the universal ball joint.

Preferably, the universal ball joint and the support are an integral structure.

Preferably, the support is rod-shaped and has a gripping part formed at its lower end; and the terminal clamp is composed of a fixing plate with an adjustable distance from top end to bottom end, and an upper fixing arm and a lower fixing arm at both ends thereof.

Preferably, the support comprises charging power control module, the charging power control module further comprises:

power unit, providing power for the terminal;

power management unit is coupled with the power unit, for managing charging and discharging for the power unit;

external power unit is coupled with the power management unit, for charging for the power unit; and terminal charging unit is coupled with the power management unit, for charging for the terminal.

Preferably, the front end face of the fixing plate, the lower end face of the upper fixing arm and the upper end face of the lower fixing arm are all provided with flexible backing plates.

Preferably, a convex lens is arranged at the front side of the lower fixing arm or at the back of the fixing plate.

Preferably, the rod-shaped support is provided with a telescopic structure.

On the other hand, the invention also provides a system for controlling a camera arranged in a terminal through peripheral equipment at the same time, characterized in that the system comprises the peripheral equipment as described above and a terminal provided with the camera, wherein the terminal comprises a receiving device and a processing device mounted on the terminal;

the receiving device comprises an interface interacting with the peripheral equipment, the receiving device receives a trigger event signal sent by the peripheral equipment, converts the signal into a control digital signal and then sends the control digital signal to the processing device; and the processing device is coupled with the receiving device, and receives the control digital signal sent by the receiving device to adjust the terminal.

Preferably, when the terminal is operating in the first mode, the peripheral equipment generates the first trigger event signal based on the operating action of the user to adjust the camera of the terminal.

Preferably, when the terminal is operating in the second mode, the peripheral equipment generates the second trigger event signal based on the operating action of the user to adjust the LED of the terminal.

Preferably, the interface interacting with the peripheral equipment comprising at least one of an earphone jack, a USB jack, a power jack, an infrared receiving interface, a bluetooth receiving interface, a WIFI receiving interface, a radio frequency receiving end, a microphone, a camera, an optical receiving unit and a gravity sensor arranged on the terminal.

Preferably, the earphone jack of the terminal is used, the terminal or the peripheral equipment further comprises a sound sensor therein, and the sound sensor obtains an operating voltage through an MIC pin of the terminal, collects an external sound and sends the external sound to the terminal for recording sound.

Preferably, the system also comprises an output indication unit, which performs corresponding output indication in a user perceivable way according to a signal of adjusting the camera of the terminal.

Preferably, the user perceivable way includes at least one of acoustic, optical and vibration signals.

Preferably, the optical signal is adopted, and the output indication unit comprises at least one LED lamp arranged corresponding to the front side and/or the rear side of the terminal.

On the third hand, the invention also provides a method for controlling a camera arranged in a terminal through peripheral equipment, characterized in that the method comprises the following steps:

the peripheral equipment generates the first trigger event signal or the second trigger event signal according to an operation action of the user;

the peripheral equipment transmits the first trigger event signal or the second trigger event signal to the terminal;

the terminal converts the first trigger event signal or the second trigger event signal into the first control digital signal or the second control digital signal; and the terminal adjusts the camera according to the first control digital signal, and adjusts the LED according to the second control digital signal.

Preferably, while performing signal conversion, the terminal also performs noise filtration on the waveform of the trigger event signal in order to filter out vibration.

Preferably, the process of converting the trigger event signal into the control digital signal is as follows:

The terminal performs capture analysis on the trigger event signal, identifies the rule and pattern of the trigger event signal, and converts the signal into the control digital signal corresponding to an operation according to a predefined strategy.

Preferably, the method also comprises the step that the terminal performs beautification processing on an image obtained by the camera through Gaussian Blur Algorithm.

Preferably, the method also comprises the step that the terminal performs mosaic processing on a plurality of images obtained by the camera.

Preferably, the method also comprises the step that the terminal performs special effect processing on an image obtained by the camera through preset filter effects.

(III) Beneficial Effects

Compared with the prior art, the photo taking system and the method for controlling the camera arranged in a terminal through the peripheral equipment, and the equipment achieve the following effects:

1. by adopting the technical solution of the invention, the problem that mobile terminals with relatively large sizes are unfavorable for photo taking operation of users is effectively solved; and 2. by adopting the technical solution of the invention, advanced ways of photo taking can be implemented, such as key control photo taking, sound control photo taking, face control photo taking, somatosensory control photo taking, rotary control photo taking, remote control photo taking, photosensitive control photo taking and eyeball recognition control photo taking, and the photo taking pleasure is effectively enhanced.

3. by adopting the technical solution of the invention, backup power for the mobile terminal can be provided.

4. by adopting the technical solution of the invention, the effective lighting limited by arm length and the degree of freedom can be solved to some extent.

DETAILED DESCRIPTION OF THE EMBODIMENTS

Figure 1:
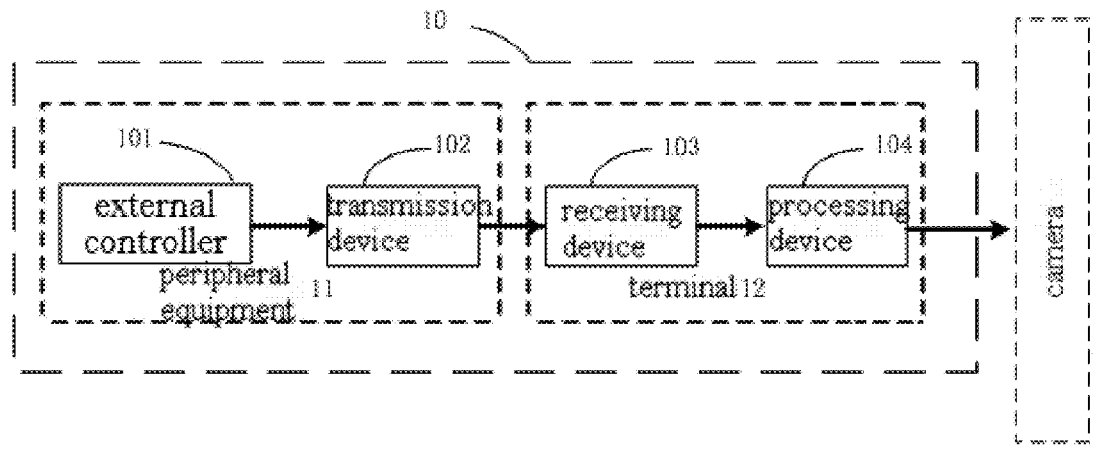
FIG. 1 is a structural block diagram of the system for controlling a camera arranged in a terminal through peripheral equipment of the first embodiment of the invention.

If certain terms are used in the description or in the claims to indicate a specific component, it is to be understood by those skilled in the art that hardware manufacturers may use different nouns to define the same component. In the description and the claims, name differences are not used to distinguish components, but instead, functional differences of the components are a criterion for distinction. The terms "including", "includes", and so on, mentioned throughout the description and the claims is an open-type wording, it should be interpreted as "including but not limited to". The wording "a/an" does not exclude plurality. The term "substantially" means within an acceptable error range, and those skilled in the art can solve the technical problem within a certain error range, and substantially achieve the technical effects. In addition, the term "couple" herein includes any direct and indirect electrically connecting means. Therefore, if it is described that a first device is coupled to a second device, it represents that the first device can be directly electrically connected to the second device, or indirectly electrically connected to the second device by other device or connecting means. Subsequently described in the description are preferred implementing ways for carrying out the invention; however, such description is made for the purpose of explaining general principles of the invention, instead of limiting the scope of the invention. The protection scope of the invention should accord with what is defined in the appended claims.

The invention is further described in details in conjunction with the accompanying drawings, however, the description is not a limitation of the invention.

First Embodiment

In the technical solution of the invention, to provide convenient and quick operation means of photo taking and the effective lighting mode, the first problem to be solved is that the existing terminals lack effective external control equipment, and to this end, in one embodiment of the invention, peripheral equipment for controlling a camera arranged in a terminal is provided, and the peripheral equipment is used for generating an effective operation signal and transmitting the signal to the terminal. It is to be understood by persons of relevant skill in the art that the signal generated by the peripheral equipment is described to be used for controlling the camera or LED of the terminal in the first embodiment, but in practical situations, the peripheral equipment is only used for providing assistance for user operation, and the function of the signal generated by the equipment is ultimately determined by the terminal, and in addition to controlling the camera or LED, the signal obviously can also be used for controlling other functions of the terminal, such as controlling music playing, controlling user interface operation or controlling game pictures. Therefore, controlling the camera or LED should not be understood as the only defining of the technical problem to be solved by the peripheral equipment of the invention.

Specifically, as shown in FIG. 1, in a preferred embodiment of the invention, the peripheral equipment 11 for controlling the camera arranged in a terminal comprises at least one external controller 101 and at least one transmission device 102, wherein the at least one external controller 101 comprises a user operation end and a trigger signal generator, the user operation end receives an operation action of a user, and the trigger signal generator generates a regular trigger event signal according to the operation action; and the at least one transmission device 102 comprises an interface interacting with the terminal, and transmits the trigger event signal to the terminal through a transmission medium.

Furthermore, in a more preferred embodiment of the invention, a system 10 for controlling a camera arranged in a terminal through peripheral equipment comprises the peripheral equipment 11 as described above and a terminal 12 provided with the camera, wherein, the terminal 12 may be a mobile terminal, a tablet computer or any portable electronic device, which is not defined herein. The terminal 12 comprises a receiving device 103 and a processing device 104, wherein the receiving device 103 comprises an interface interacting with the peripheral equipment, receives a trigger event signal sent by the peripheral equipment, converts the signal into a control digital signal and then sends the control digital signal to the processing device; and the processing device 104 is coupled with the receiving device, and receives the control digital signal sent by the receiving device to adjust the camera of the terminal. Furthermore, the LED of the terminal can also be adjusted according to the received control digital signal.

In the embodiment, the external controller 101 receives the input of the operation action of the user by the user operation end, the user operation end can be a key, a handle, a somatosensory controller or a touch pad, or a combination thereof. A control analog signal could be generated through keystroke action trigger, somatosensory/gravity sensory trigger or wireless signal trigger (correspondingly, the keystroke action trigger can achieve button control photo taking; the somatosensory/gravity sensory trigger can achieve somatosensory control photo taking, rotary control photo taking, or brain wave, eye movement, virtual key control photo taking and so on; and the wireless signal trigger can achieve sound control photo taking and remote control photo taking); and the control analog signal can be transmitted in a wired way (e.g. via an earphone cable or a USB cable etc.), and can also be transmitted in a wireless way (e.g. via infrared, bluetooth or WIFI etc.), and what is described above is not defined herein. Of course, in other preferred implementing ways, the invention can also adopt an optical device to send a face image, a limb movement image, an eyeball movement image of the user or other optical signals to the terminal which is used for controlling as the trigger event signal, or a touchpad sends a signal to the terminal which is generated from user click or gesture operation and etc., thereby achieving respective control way.

In the embodiment, the interface of the transmission device 102 can be an earphone connector, a USB interface, a power connector, an infrared component, a bluetooth component, a WIFI component, an RF (Radio Frequency) component, a speaker, an optical unit, or a gravity sensory component (for example, means of transmitting gravity adjustment operation on rotation, acceleration etc. of the terminal to the terminal through a contact point) and the like, which is not limited herein.

In the embodiment, the receiving device 103 can be arranged inside the terminal, and converts the control analog signal into a digital signal which can be identified by the terminal.

In the embodiment, the processing device 104 can be a processing chip of the terminal, and it can generate various control analog signals according to the received digital signal in order to control the camera or LED of the terminal to be subjected to different adjustments, for example, for the camera: single photo taking, continuous photo taking and/or video photo taking and so on; for the LED: turning on, turning off and interval flashing and so on. This is not defined herein. As previously described, the control function of the signal is ultimately determined by the terminal, and in addition to controlling the camera or LED, obviously the signal can also be used for controlling other functions of the terminal, such as controlling music playing, controlling user interface operation or controlling game pictures, which are all depending upon the actual output of the processing device and should not be understood herein as limitation of the invention.

Figure 6:
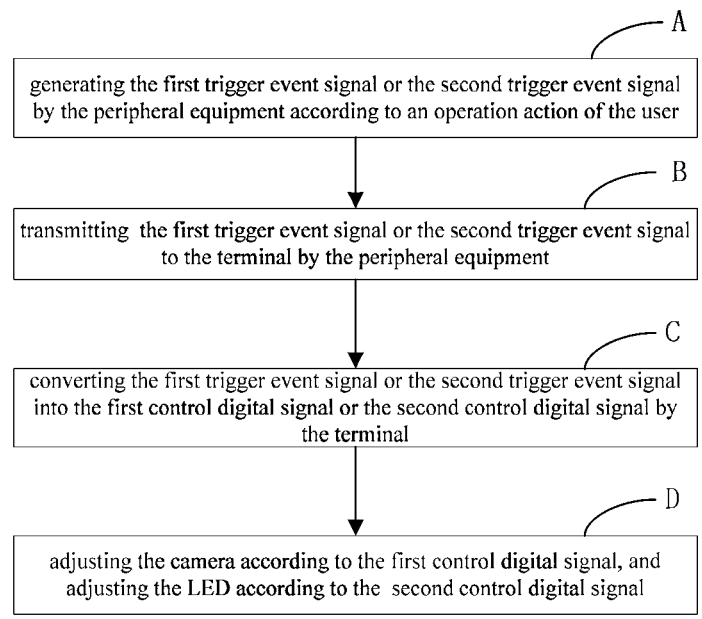
FIG. 6 is a flow diagram of a method for controlling a camera arranged in a terminal through peripheral equipment in embodiments of the invention.

Correspondingly, in the embodiment, as shown in FIG. 6, a method for controlling the terminal through the peripheral equipment is as follows:

step A, the peripheral equipment generates the first trigger event signal or the second trigger event signal according to an operation action of the user;

step B, the peripheral equipment transmits the first trigger event signal or the second trigger event signal to the terminal;

step C, the terminal converts the first trigger event signal or the second trigger event signal into the first control digital signal or the second control digital signal; and step D, the terminal adjusts the camera according to the first control digital signal, and adjusts the LED according to the second control digital signal.

Second Embodiment

The embodiment involves description of particular implementation of the peripheral equipment of the invention, that is, the at least one external controller 101 can be arranged in a hand-held controller, the at least one external controller 101 is provided with a reset key, and the existence of the control analog signal is controlled through an on-off action of the reset key (when the key is pressed, the control analog signal disappears; and when the key is released, the control analog signal is recovered). The control analog signal can be a complex time sequence signal (such as, a signal at a certain frequency), a simple RC delay trigger signal or the simplest high and low level switching signal.

Figure 2:
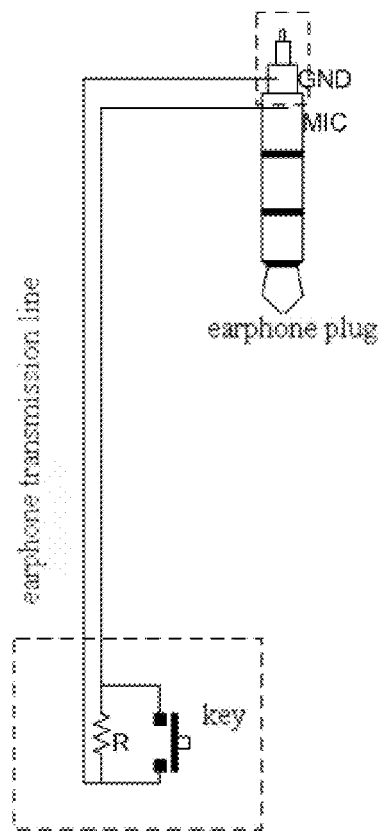
FIG. 2 is a structural schematic diagram of an external controller and a transmission device of the second embodiment of the invention.

The at least one transmission device 102 can be an earphone cable (as shown in FIG. 2), with one end having an earphone connector passing through a transmission hole of a connecting rod 3 and being connected with an earphone interface of the terminal, and with the other end being connected with the external controller 101. The earphone plug comprises an MIC port (microphone, i.e. sound input channel) and a GND port (ground terminal) (correspondingly, the earphone jack of the terminal also comprises an MIC and a GND), and the MIC and GND ports are connected to two pins of the reset key in the external controller 101, with a resistor and a capacitor connected in parallel at the same time. Thus, when the reset key is pressed, the MIC port is shorted to the ground terminal, and the control analog signal disappears; and after the key is released, the voltage of the control analog signal is recovered to the original level state.

Figure 3A:
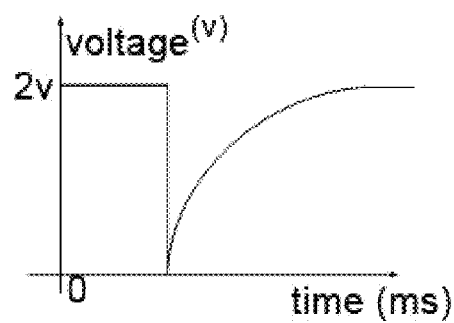
FIG. 3a is schematic diagram of voltage values generated by the control analog signals of the second embodiment of the invention.
Figure 3B:
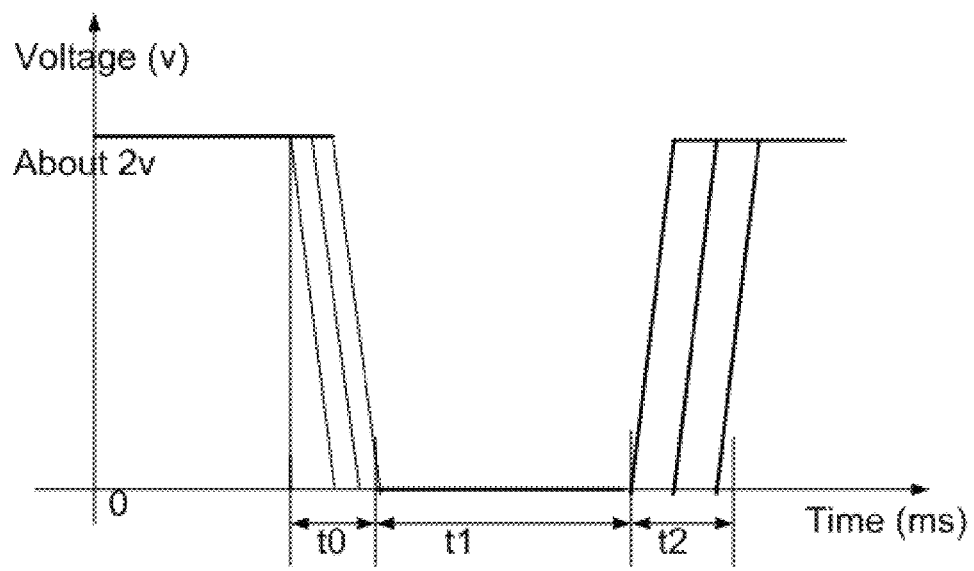
FIG. 3b is a waveform schematic diagram of practical button operation electrical signal.

The receiving device 103 is arranged inside the terminal, and identifies whether there is signal voltage changing resulting from the pressing of the key. In normal conditions (as shown in FIG. 3a), the level of the control analog signal is maintained at around 2V, and when the reset key is pressed, the control analog signal is immediately changed to a low level, which continues until the pressed key is released. After the reset key is released, the level is gradually recovered to a high level of around 2V. It is to be noted that the problem of vibration during press exists in practical button operation (as shown in FIG. 3b), and the control analog signal is closer to the waveform of the schematic diagram in FIG. 3b below: repeated jump may exist in the pressing and releasing processes, for example, during t0 and t2, a stable low level t1 will be maintained after pressing. In normal conditions, the time of t0 and t2 can be less than 50 ms, and t1 may be kept for more than hundreds of milliseconds. Therefore, the receiving device 103 adopts a common simple noise filter method to filter vibration, in order to obtain a determined keystroke action. The receiving device 103 converts a voltage change signal generated from the keystroke action into a digital signal that can be identified by the processing device 104.

After the receiving device confirms a button signal input, more trigger events can be defined accordingly. For example, in the first mode, a single keystroke in is means taking photo; multiple keystrokes in is means entering mode setting; and in the mode setting, a plurality of input control events can be further achieved according to the number of keystrokes and the time intervals. In the second mode, two keystrokes in 0.5 s means entering mode switching of LED control function, it can be switched between the basic mode and encoding mode. Wherein, in the basic mode, each keystroke turns the LED on or off; in the encoding mode, encoded signal can be edited on the terminal (such as the on or off duration of the LED, and cycle parameter and so on), and each keystroke makes the encoding send or stop, to achieve interval flashing, and the function similar to the Morse Code and so on.

The processing device 104 is a terminal processing chip, which receives the digital signal sent by the receiving device 103, and further controls the camera of the terminal to complete camera actions in the first mode, such as single photo taking, continuous photo taking and/or video photo taking; and further controls the LED of the terminal to complete LED actions in the second mode, such as turning on, turning off and interval flashing and so on.

The control input can be achieved in many feasible ways, and earphone jack input is only a simple implementing example. In addition to the above technical solution, another way can be adopted as follows: a bluetooth module is mounted at a handle end, and mobile phone bluetooth is used to achieve both-way communication; or the handle is directly rotated without any external circuit, and a gravity sensor of the mobile phone is used to sense the rotation, thereby obtaining the input control signal. Sound control photo taking can also be achieved in the invention, the external controller 101 is internally provided with an audio signal transmitting circuit for transmitting audio signals at different frequencies, and signals are output by a miniature speaker to a microphone (MIC) of the terminal, so that the terminal records the audio signals at different frequencies to generate different control functions.

Third Embodiment

Figure 4A:
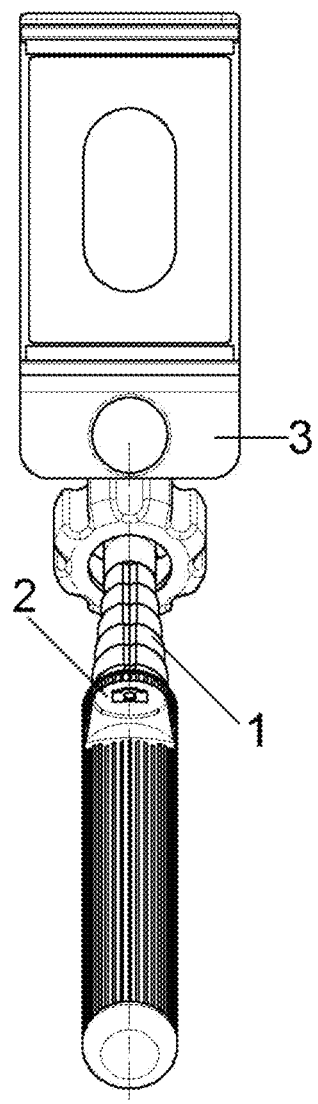
FIG. 4a is a front view of the overall structural appearance of the peripheral equipment for controlling the camera arranged in a terminal of the third embodiment of the invention.
Figure 4B:
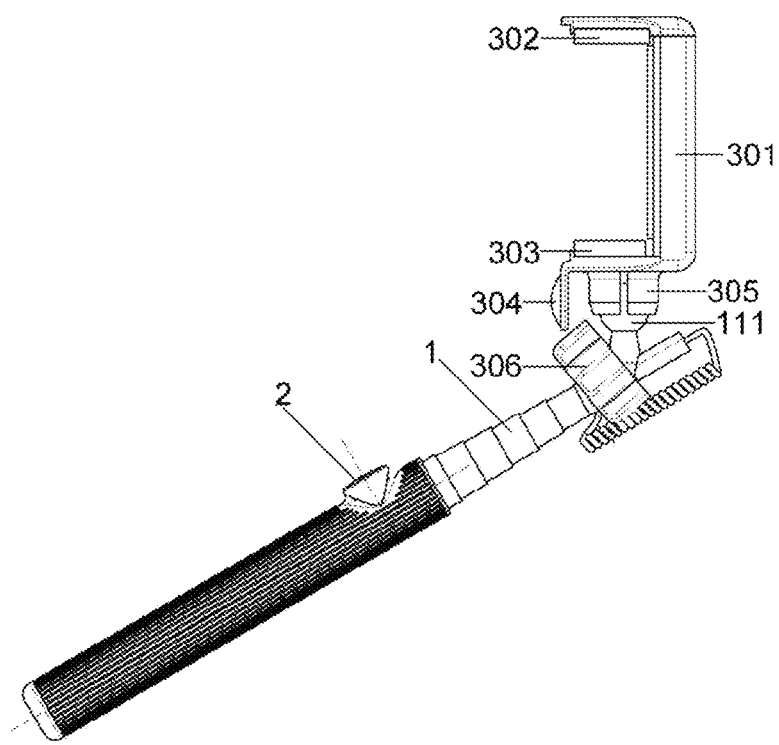
FIG. 4b is a right view of the overall structural appearance of the peripheral equipment for controlling the camera arranged in a terminal of the third embodiment of the invention.

Further as shown in FIGS. 4a and 4b, just take earphone cable transmission as an example, the overall structure of the peripheral equipment for controlling the camera arranged in a terminal also comprises a support rod 1, a terminal clamp 3 and an action trigger control device 2, a lower-part rod body of the support rod 1 is a handle, an upper-part rod body thereof is provided with a telescopic structure, and the upper end of the support rod is connected with the terminal clamp 3; the terminal clamp 3 is provided with an upper fixing arm and a lower fixing arm, with the distance therebetween being adjustable for clamping and fixing terminals with different sizes; and the action trigger control device 2 (i.e. the external controller) can generate the control analog signal from keystroke action trigger, gravity sensory trigger and/or wireless signal trigger.

Preferably, the support rod 1 is provided with a universal ball joint 111 which is arranged at the upper end of the support rod 1, and the universal ball joint 111 and the support rod 1 form an integral structure; of course, the universal ball joint 111 can also be fixed to the support rod 1 in welding manner, or a ball seat is arranged at the upper end port of the support rod 1, the universal ball joint 111 is fixed to the ball seat in clamping manner, and the connecting structure of the universal ball joint 111 is not defined herein. Of course, the support rod and the terminal clamp can also adopt other direct fixed connection and flexible connection structures in the prior art.

The function of the terminal clamp is to adaptively fix terminals with different sizes to the support rod, and generally a size adjusting and clamp fixing mechanism needs to be arranged. This is not defined in the invention, and those skilled in the art can choose an appropriate structure in the prior art optionally. In the embodiment, the terminal clamp 3 is composed of a fixing plate 301 with adjustable distance from top end to bottom end, and fixing arms 302 and 303 at both upper and lower ends, and can enclose a clamping space for accommodating a mobile terminal, wherein the fixing plate 301 and the fixing arms at both ends thereof form an integral structure, and the fixing plate 301 and the fixing arms 302 and 303 can be, but not limited to, in the common geometrical shapes of squares, rectangles, polygons and so on; the front end face of the fixing plate 301, the lower end face of the upper fixing arm 302 and the upper end face of the lower fixing arm 303 are all provided with backing plates; the lower end face of the lower fixing arm 303 is provided with a ball seat 305, which is in sleeve connection with the universal ball joint 111 at the upper end of the support rod 1, thus achieving the adjustment at any angle or direction; and the front side of the lower fixing arm 303 is provided with a convex lens 304, so as to facilitate self photo taking by users. The handle at the lower part of the support rod can also be provided with a plurality of stripes, to increase the friction when being held by the user.

The action trigger control device can be one or more control keys, gravity sensors and/or wireless signal receivers, and preferably, in the embodiment, the action trigger control device is a button (an implementing way of the user operation end) arranged on the handle.

Figure 4C:
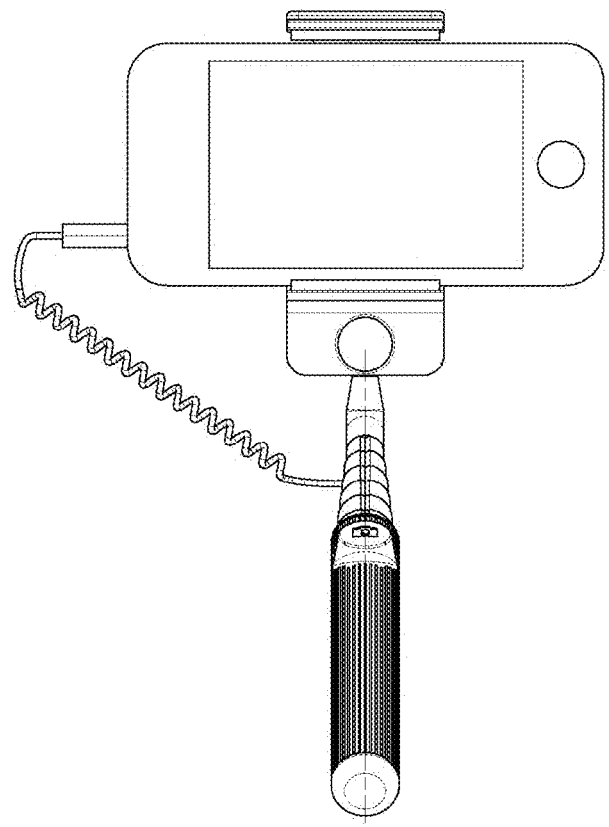
FIG. 4c is a schematic view of the peripheral equipment for controlling the camera arranged in a terminal in the third embodiment of the invention, after the terminal is fixed on the peripheral equipment.

In the embodiment, as shown in FIG. 4c, specifically, the terminal can operate in the camera function (the first mode) and the LED control function (the second mode), when the terminal operates in the first mode, the peripheral equipment generates the first trigger event signal to adjust the camera of the terminal according to an operation action of the user. For example, the first trigger event signal can include when the button 2 completes the first keystroke, if the second keystroke action does not occur in 1 s, then the terminal enters a single photo taking mode for photo taking; when the button 2 completes the first keystroke, if the second keystroke action occurs in 1 s, then the terminal enters a continuous photo taking mode, preferably the continuous photo taking mode is three continuous photo taking mode; after the button 2 enters the continuous photo taking mode, when the first keystroke action is completed, if the second keystroke action does not occur in 1 s, then the terminal takes photos in the continuous photo taking mode; after the button 2 enters the continuous photo taking mode, if two times of keystroke actions occur in 1 s, then the terminal switches from the continuous photo taking mode back to the single photo taking mode. When the terminal operates in the second mode, the peripheral equipment generates the second trigger event signal to adjust the LED of the terminal according to an operation action of the user. For example, the second trigger event signal can include when the button 2 completes the first keystroke, if the second keystroke action does not occur in 0.5 s, then the terminal controls the LED correspondingly in the current mode. Specifically, if the current mode is the basic mode, then the terminal controls the LED to turn on or off; if the current mode is the encoding mode, then the terminal makes the encoding send or stop, to achieve interval flashing, and the function similar to the Morse Code and so on; when the button 2 completes the first keystroke, if the second keystroke action occurs in 0.5 s, then the terminal enters mode switching of LED control function, it can be switched in the current mode. Specifically, if the current mode is the basic mode, it can be switched to the encoding mode, if the current mode is the encoding mode, it can be switched to the basic mode. of course, the button 2 can also adopt a multifunctional key structure, that is, the button 2 can generate different control analog signals when being pressed toward different directions, and what is described above is not defined herein.

In the embodiment, the backing plate is a backing plate made of sponge, foam or other soft materials, which is not specifically defined herein.

In the embodiment, the lens surface of the convex lens 304 faces toward the user to facilitate self photo taking by users.

In the embodiment, the earphone cable can be an elastic spiral line, provided with an earphone plug at one end connected with the terminal, and the other end of the earphone cable passes through the interior of the support rod 1 and is connected to the button 2, which is not specifically defined herein.

Figure 5:
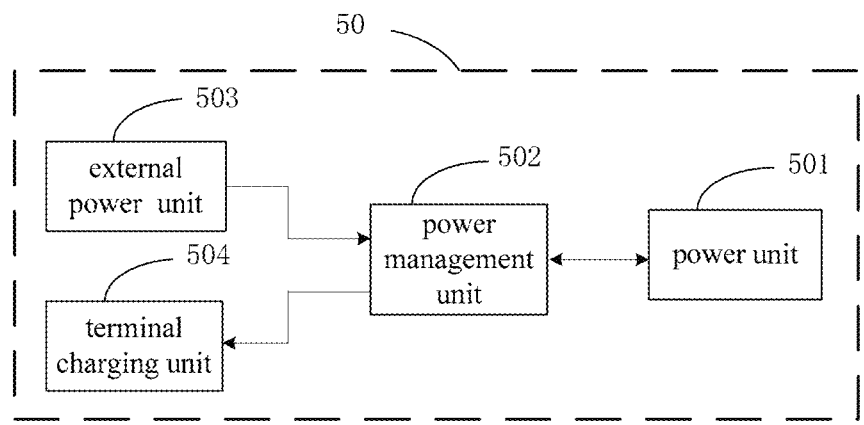
FIG. 5 is a schematic functional block diagram of the charging power control module in one embodiment of the invention.

FIG. 5 shows a schematic functional block diagram of the charging power control module in one embodiment of the invention. The support comprises charging power control module. Wherein, power unit 501 provides power for the terminal. The power unit 501 can be lithium battery, which is not specifically defined herein. The power management unit 502 coupled with the power unit 501 manages charging and discharging for the power unit 501.

The power management unit 502 can be a open common circuit of the industry to control charging and discharging for one or two lithium batteries, which is not specifically defined herein. The external power unit 503 coupled with the power management unit 502 charges for the power unit 501. The adapter connector of the external power unit 503 can use USB, MicroUSB or MiniUSB interface structure, and it also can directly use the earphone to be the charging interface (in this case it needs to provide special charging adapter to convert earphone interface to USB interface). The terminal charging unit 504 coupled with the power management unit 502 charges for the terminal. The adapter connector of the terminal charging unit 504 depends on the terminal type. Specifically, the charging interface of terminal with the Android operating system is usually MicroUSB, the charging interface of terminal with the IOS operating system is the Lighting Spin interface.

the handle which is hollow inside is preferably provided with a power box for accommodating a battery, which is not specifically defined herein.

In the embodiment, the support rod 1 has a bent structure at the upper end rod body, with a bending angle adapted to the adjustment of the universal ball joint 111, which is not specifically defined herein.

In the embodiment, after the universal ball joint 111 and the ball seat 305 are connected in a sleeved manner, they can also be screwed and fixed through a screw cap 306, which is not specifically defined herein.

Figure 4D:
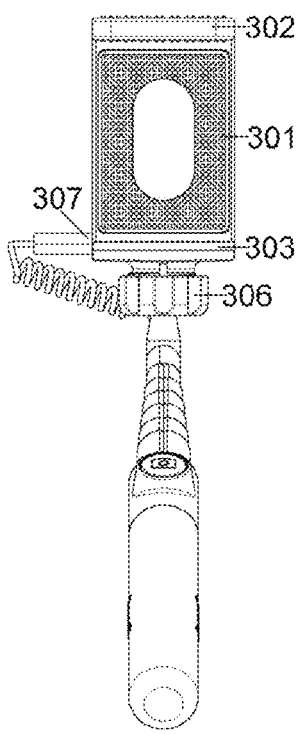
FIG. 4d is a front view of the overall structural appearance of the peripheral equipment for controlling the camera arranged in a terminal in another implementing way in the third embodiment of the invention.
Figure 4E:
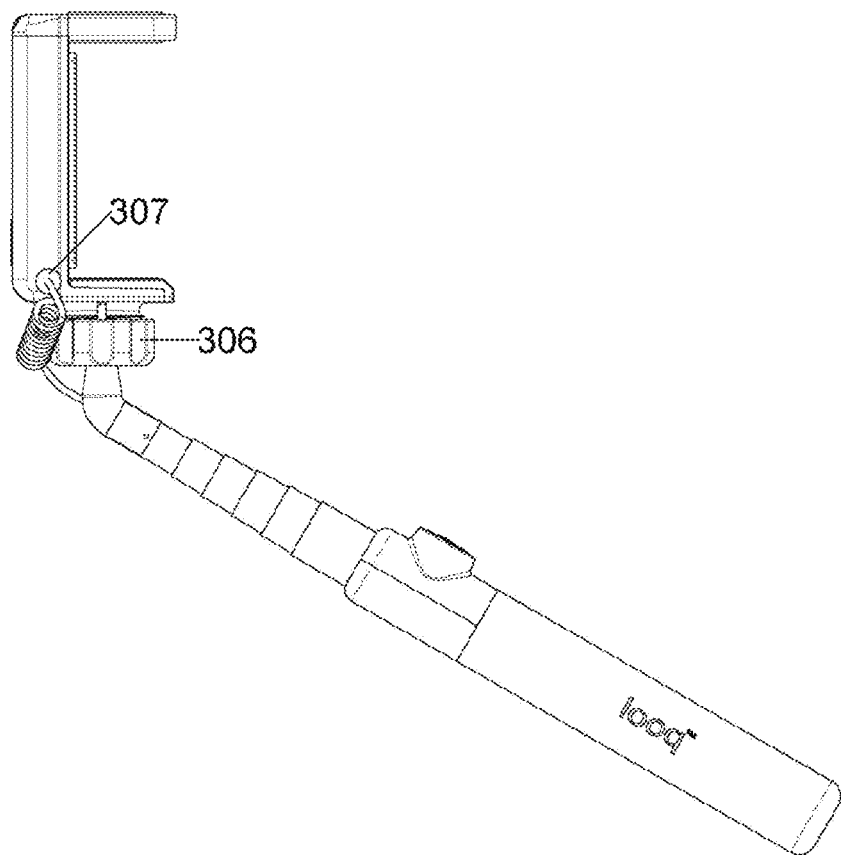
FIG. 4e is a left view of the overall structural appearance of the peripheral equipment for controlling the camera arranged in a terminal in another implementing way in the third embodiment of the invention.
Figure 4F:
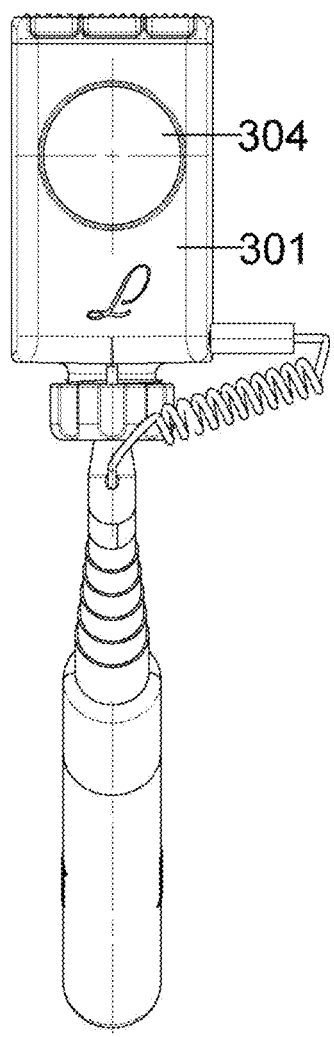
FIG. 4f is a rear view of the overall structural appearance of the peripheral equipment for controlling the camera arranged in a terminal in another implementing way in the third embodiment of the invention.

FIGS. 4*d*, 4*e* and 4*f* provide another implementing way of the overall structure of the peripheral equipment, the main body structure thereof is similar to that in FIGS. 4*a* and 4*b*, and only some distinctive features in the figures are listed exemplarily herein for description, which is not a specific definition of the implementing way of the overall structure herein.

In the implementing way, to increase the friction when the terminal is clamped, convex stripes are formed on the contact surfaces of the fixing arms 302 and 303 with the terminal. Furthermore, certain protrusions (dot-shaped in FIG. 4*d*) can be formed on the contact surface of the fixing plate 301 with the terminal to increase the friction or avoid the damage to the terminal surface. In FIGS. 4*d*, 4*e* and 4*f*, as the nut 306 is already screwed and fixed, the universal ball joint and the ball seat cannot be seen in the figures any longer; and to facilitate the user self photo taking by using the camera at the back of the terminal, the convex lens 304 is arranged at the back of the fixing plate 301 in the implementing way.

In addition, unlike in FIGS. 4*a* and 4*b*, when the earphone plug 307 is not connected to the terminal (i.e. the interface of the transmission device interacting with the terminal) on the earphone cable in FIGS. 4*d*, 4*e* and 4*f*, it is plugged at one side of the fixing plate 301 (plugged at the upper end of the support rod in FIGS. 4*a* and 4*b*), and the method prevents the earphone cable and the plug from swaying or being pulled when not being used.

Fourth Embodiment

Subsequently, some more preferred circuit implementing ways of the invention are described below. The system of the invention also comprises an output indication unit for indicating the photo taking condition, and the output indication unit performs corresponding output indication in a perceivable way of user, according to a signal for adjusting the camera of the terminal by the processing device.

Figure 7A:
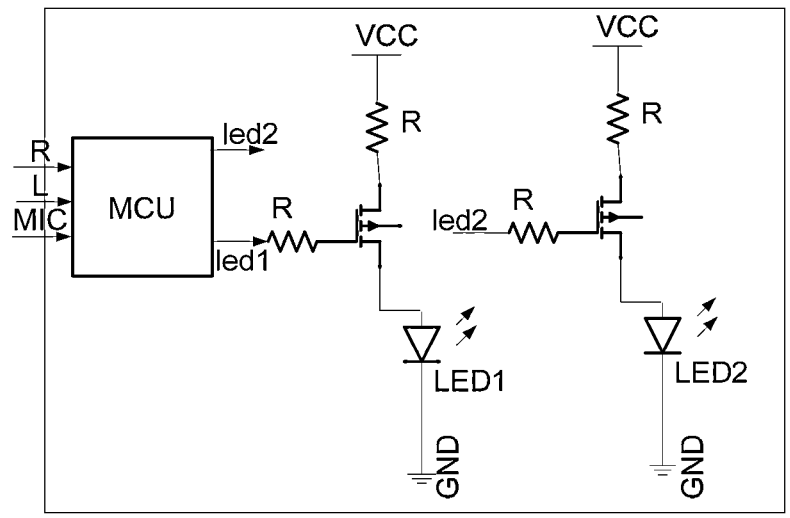
FIG. 7a is a circuit schematic diagram of an output indication unit in one embodiment of the invention.

As shown in FIG. 7*a*, two LEDs (Light Emitting Diodes) are adopted for a blinking prompt of the output condition in one embodiment of the invention. An MCU (Micro Control Unit) uses two GPIO (General Purpose Input Output) pins to control the LEDs: when an led1 pin is at a low level, an MOST transistor is turned on, and an LED1 lights up; otherwise the MOS1 transistor is turned off, and the LED1 does not light up; and when an led2 pin (for clear illustration in FIG. 7, the led2 pin is not directly connected with the input of the LED2, but in fact the output of the led2 pin is connected with the input end of LED2 directly) is at a low level, an MOS2 transistor is turned on, and an LED2 lights up; otherwise the MOS2 transistor is turned off, and the LED2 does not light up. The two light emitting diodes (LED1, LED2) can be respectively mounted at the front side and the rear side of the terminal clamp, so that no matter the user uses a front camera or a rear camera of the mobile phone for self photo taking, there is one LED lamp that can be used. The MCU collects an L/R (left/right channel) or MIC pin signal to obtain an LED blinking mode. A mobile phone L/R can only output an audio signal, and a built-in analog-digital converter of the MCU is used in the circuit to sample and analyze the frequency of the signal input by the L/R, so that the corresponding control condition is obtained. For example, in single photo taking, an audio signal at 1 Khz is input and lasts for 50 ms; and the LED lamp blinks once (e.g. lighting for 1 s) following the photo taking shutter action. In three continuous photo taking, an audio signal at 2 Khz is input and lasts for 50 ms; and the LED lamp blinks slowly in the preparation period and blinks quickly following the shutter action in three continuous photo taking period (e.g. lighting for 500 ms every other 1 s and lasting for 5 s in the preparation period; and blinking for three times in is following the shutter action in the continuous photo taking period). In video recording, an audio signal at 4 Khz is input and lasts for 50 ms; and the LED lamp blinks slowly (e.g. lighting for 500 ms every other 2 s).

Alternatively, the MCU can directly collect an operation action of the user, to obtain the control condition corresponding to the LED blinking. In addition, the invention can further combine a shaking device of the terminal to indicate the output condition, for example, when single photo taking is conducted, the device shakes once (e.g. shakes for 500 ms) following the photo taking shutter action; in three continuous photo taking, the device does not shake in the preparation period and shakes following the shutter action in the three continuous photo taking period; and in video recording, the device shakes once in start-up, and shakes once when the video photo taking is stopped, and so on, which is not specifically defined herein.

In the way of adopting the earphone cable, if the earphone jack of the terminal is adopted for input and output control, in general conditions the terminal usually cannot use a built-in MIC for sound recording due to the plugging of the earphone connector. Under this circumstance, a sound signal can be input through an MIC pin of the earphone connector, and a sound sensor can be used in the terminal or the peripheral equipment, and generally, a relatively excellent sound recording effect can be achieved by using any kind of MEMS MIC sensor.

Figure 7B:
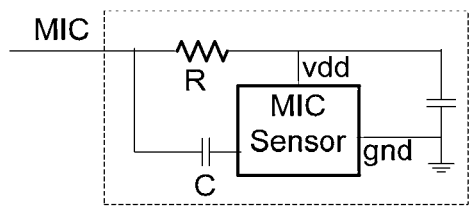
FIG. 7b is a schematic diagram of an access circuit of a sound sensor (MIC Sensor) in one embodiment of the invention.

As shown in FIG. 7b, usually the MIC pin of the terminal has a bias voltage of around 2V, which is used to provide an operating voltage for the MIC Sensor. In operation, a sound recording output of the MIC Sensor is coupled to an MIC signal through a capacitor C and, and hence an input audio signal will be superimposed on the 2V bias voltage of the MIC pin of the terminal.

Figure 7C:
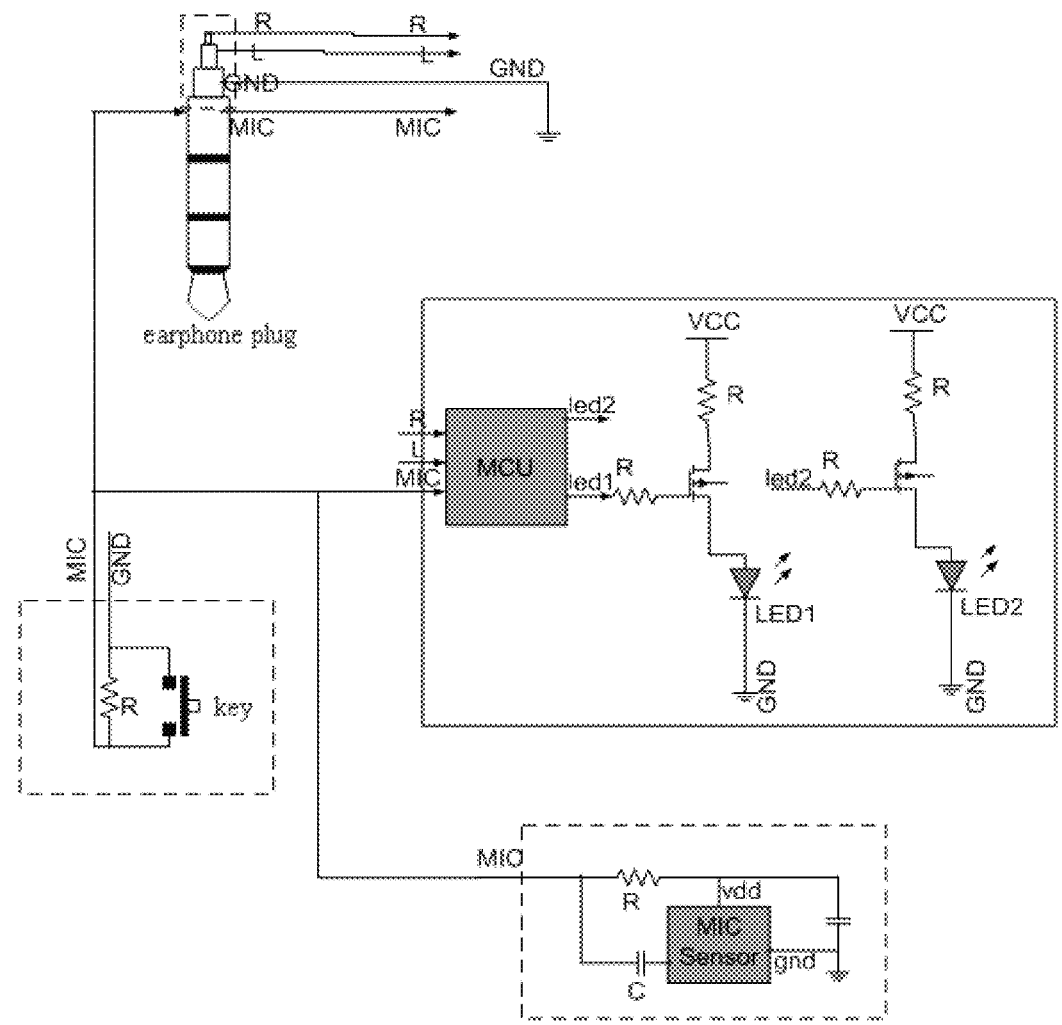
FIG. 7c is a schematic diagram of combinational connection of circuits in various units in one implementing way of the invention.

FIG. 7c shows usage of a 4-pole connector for an earphone for controlling a camera. The 4-pole includes a L (left channel), R (right channel), GND (ground), and MIC (microphone) as shown in FIG. 7c. FIG. 7c also shows a combinational connecting way of a plurality of circuits when earphone cable input control is adopted: the keystroke action is directly sent to the terminal MIC, and also transmitted to the MCU at the same time as control conditions of LED blinking; and in video and sound recording, the output of the MIC Sensor is also directly coupled to the MIC pin. In this case, the particular implementing way of the key is as follows: The two ends of mic and gnd terminals of the earphone interface are directly connected to two pins of the reset key, with a resistor (and optionally a capacitor, not shown in the figure) connected in parallel at the same time, so that when the key is pressed, the mic is shorted to the ground, and after the key is released, the voltage is recovered to the original level state.

Figure 7D:
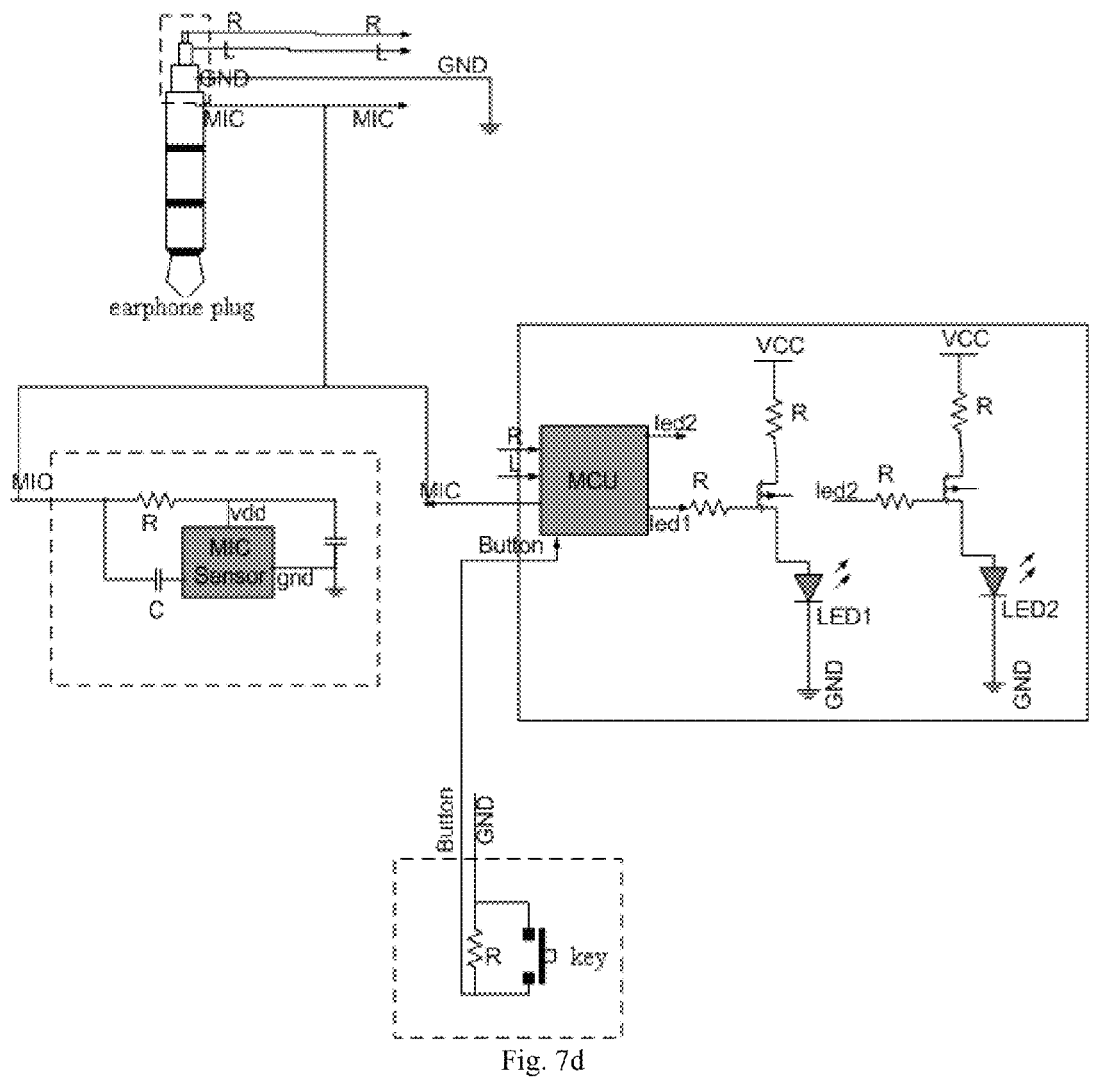
FIG. 7d is a schematic diagram of combinational connection of circuits in various units in another implementing way of the invention.

FIG. 7d shows another combinational connecting way of circuits, and in this way, a keystroke control signal (button) is firstly transmitted to the MCU, and after the signal is identified by the MCU, a control signal is then transmitted to the MIC pin of the terminal; and in video and sound recording, the output of the MIC Sensor is also directly coupled to the MIC pin.

In such a circuit condition, the MCU can generate a special control signal to the terminal, thereby simplifying the processing work inside the terminal. For example, the MCU can generate audio signals at different frequencies to the MIC pin of the terminal according to different conditions; and at the terminal side, input control information can be obtained merely by inputting an audio signal and taking simple analysis.

Figure 7E:
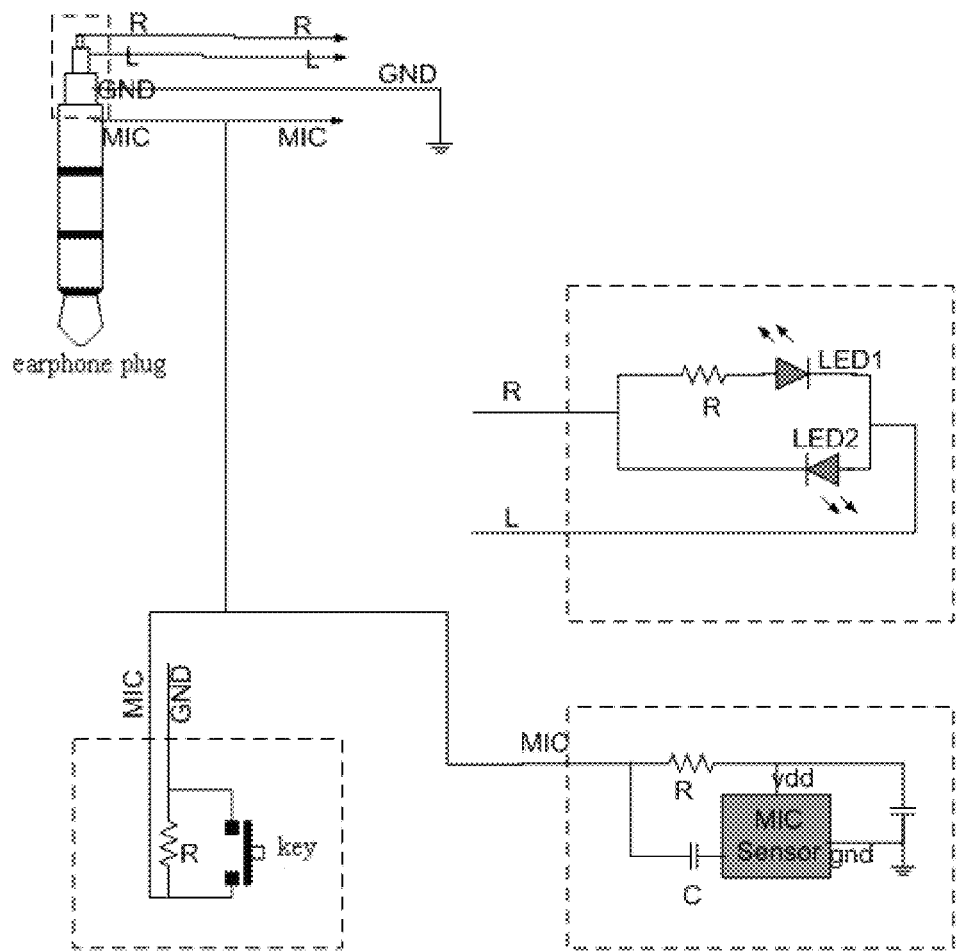
FIG. 7e is a schematic diagram of combinational connection of circuits in various units in yet another implementing way of the invention.
Figure 7F:
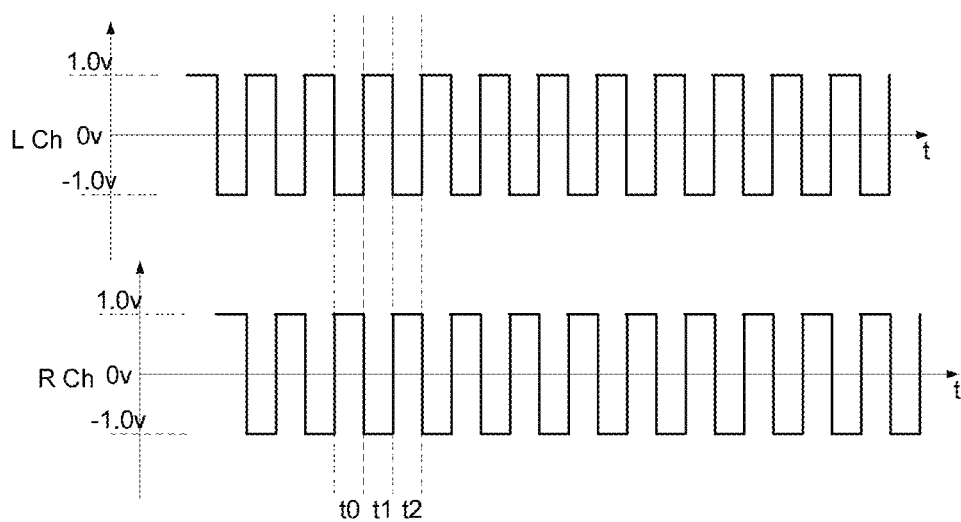
FIG. 7f is a waveform schematic diagram of an input signal in the implementing way of FIG. 6e.

FIG. 7e further gives a circuit implementing way without adopting the MCU, and in this way, the keystroke control signal is directly transmitted to the MIC pin of the terminal; in video and sound recording, the output of the MIC Sensor is also directly coupled to the MIC pin; and the LED indicating function does not need to be achieved by MCU, and it is directly controlled by an L/R channel signal of the terminal. As shown in FIG. 7f, the terminal can respectively output sine wave signals at the same frequency but in opposite phases at the L and R channels (illustrated with square waves in the figure), and generally the peak-to-peak values on the L and R channels can reach +/−0.7 v to +/−1.0 v (illustrated with +/−1.0 v in the figure). However, the conduction tube voltage drop of a light emitting diode is about 1.2 v, and in normal conditions a single channel (R or L) can not light up an LED. If L and R output signals in opposite phases, then at the moment of t0, the voltage difference Vr−l between R and L is 2.0 v, and the LED1 in the circuit can be turned on; at the moment of t1, the voltage difference Vl−r between L and R is 2.0 v, and the LED2 can be turned on; and likewise, at the moment of t2, the LED1 is turned on. This is repeated such that when the terminal outputs such kind of waveform, an LED can be lighted up; and when the terminal does not output the waveform, the LEDs are not lighted up, and thus different modes of LED blinking can be generated.

Fifth Embodiment

In the present embodiment, the specific processing process of the photo taking method of the invention is described exemplarily. In the process, the terminal performs photo taking and setting through monitoring signals transmitted from the mic input pin: in the terminal system, a thread will be started, specially used for capturing signals transmitted from the mic input pin, and once a signal is incoming, the system will trigger an event and report it to the process. After capturing the event, the process will analyze the incoming signal. Several signal patterns can be appointed in advance to represent different operations, and the signal patterns can be signals at different frequencies and with the same duration, can also be signals with different durations and at the same frequencies, and can also be other defined signal patterns. According to a predefined strategy, the system adopts different analytic algorithms to analyze the signals: for example, if signals at different frequencies and with the same duration are adopted, the frequencies of the signals will be analyzed; if signals with different durations and at the same frequencies are adopted, the durations of the signal will be analyzed; and if fixed waveform signals are adopted, the waveform of the signals will be analyzed. After the signals are successfully analyzed, the result will be transmitted to a control unit (such as a processing device) of the terminal, and after obtaining a control command, the control unit will perform corresponding operation on the camera. For example, if as appointed in advance, a signal of 2 KHZ represents photo taking, and a signal of 4 KHZ represents single photo taking/continuous photo taking mode conversion, then when learning a signal of 2 KHZ through analyzing the signal frequency, the system will send a control command of photo taking to the control unit. After obtaining the control command of photo taking, the control unit can let the camera perform photo taking. Therefore, the invention achieves the object that the user can complete the photo taking action without operating the terminal directly.

In addition, photo taking and setting can be achieved through terminal rotation. Likewise, a thread is started for monitoring the current terminal state; when the terminal rotates, a built-in gyroscope of the terminal will report the rotation state of the terminal to the process; and after capturing the terminal rotation event, the process analyzes the terminal rotation event. Different rotation states are appointed in advance to represent different operation modes, for example, the terminal rotating to the left at an angle larger than 30 degrees and turning back represents photo taking. Thus after the user rotates the terminal to the left at an angle larger than 30 degrees and turns it back, the system will capture the event and send a photo taking command to the control unit, and after obtaining the control command of photo taking, the control unit can let the camera perform photo taking.

The principle of controlling photo taking in a wireless way such as bluetooth, WIFI and infrared is the same as that in the case of the earphone cable, except that signals will not be transmitted through the mic input pin of the earphone hole, but transmitted in wireless ways. At present the system only needs to obtain the command data transmitted in the wireless way for analysis, and if the control strategy is predefined, the system transmits the command to the control unit for operation. Otherwise, no operation is performed.

After photo taking is completed, the system can also process photos according to preset special effect, for example, perform face buffing and whitening processing. In a preferred embodiment of the invention, the system uses an opencv framework to process photos through Gaussian Blur Algorithm. The blur degree is defined according to a grade set by the user to achieve the buffing and beautifying effects.

In this case, Gaussian Blur is a kind of image blur filter, which calculates transformation of each pixel in an image using normal distribution. In an N-dimension space, the normal distribution equation is $$G(r) = \frac{1}{\left(\sqrt{2\pi\sigma^2}\right)^N} e^{-r^2/(2\sigma^2)};$$

in a two-dimension space, it is defined as $$G(u, v) = \frac{1}{2\pi\sigma^2} e^{-(u^2+v^2)/(2\sigma^2)};$$

wherein r is a blur radius ($r^2=u^2+v^2$), and $\sigma$ is a standard deviation of the normal distribution. In the two-dimension space, the contours of the curved surface generated by the formula are concentric circles with a normal distribution from the center point. A convolution matrix composed of pixels which are non-zero in the distribution is transformed to the original image. The value of each pixel is set to a weighted average of the values of surrounding adjacent pixels. The value of the original pixel has the highest Gaussian value, and thus receives the greatest weight, and neighboring pixels receive smaller weights as their distance to the original pixel increases.

Figure 8:
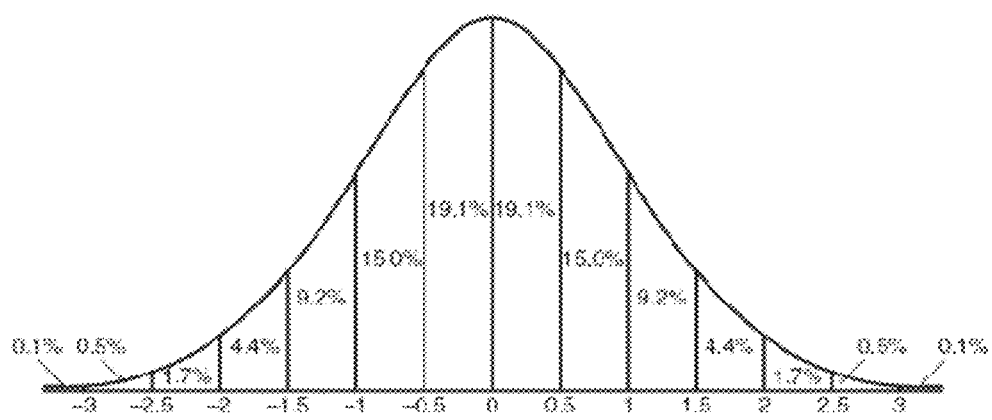
FIG. 8 is a schematic diagram of a standard curve of normal distribution.

The standard curve of normal distribution is as shown in FIG. 8, and in this figure, normal distribution is a bell-shaped curve; the closer to the center, the bigger the value is; and the further to the center, the smaller the value is. In calculating the average, it only needs to set the "center point" as the original point, and distribute weights to other points according to their positions on the normal curve to obtain a weighted average; and weighted average calculation is performed on all the pixels to obtain an image processed by Gaussian Blur.

In addition, panoramic mosaic of a plurality of photos can also be achieved in the invention, and the simple processing procedure during mosaic is as follows:

1) picture selection: the overlapping area of two pictures should not be too small, accounting for at least not smaller than 15%, so as to ensure enough corner matching;

2) corner detection: many methods are provided in OpenCV in the step, such as Harris corner detection, with detected corners stored in a CvSeq doubly linked list.

3) corner purification and conversion: a function FindHomography built in OpenCV is used for RANSAC purification, and a 3×3 conversion matrix is calculated, which is a perspective transformation matrix, and an image processed by the perspective transformation can be directly used for mosaic;

4) image mosaic: it needs to call the createDefault function to generate default parameters, and then use the stitch function to perform mosaic; and 5) spherical transformation: a coordinate system is converted from plane coordinates to spherical coordinates, to accomplish panoramic mosaic at 360 degrees.

Likewise, filter effects can also be achieved in the invention. A plurality of filter effects built in a graphic processing software are used to perform special processing on the photos, the filter effects are as freezing special effect, fusion casting effect, series pictures effect, diffusing and beautifying effect, attendance edge special effect, feature special effect, zoom blur, LOMO special effect, movie special effect, inverse color effect and the like.

In the above description, a plurality of preferred embodiments of the invention are illustrated and described, and as described above, it is to be understood that the invention is not limited to the form disclosed herein and should not be considered as an exclusion of other embodiments, but can be used for various combinations, modifications and contexts, and can be altered through the above teachings or skills or knowledge of relevant art within the range of invention conception described herein. Alterations and variations made by those skilled in the art, as long as not departing from the spirit and scope of the invention, should be within the protection scope of the appended claims of the invention.

The invention claimed is:

1. An equipment, for controlling a camera connected to a mobile terminal designed for a R, L, GND and MIC 4-pole earphone, comprising:

a controller having a user operation end for receiving an operation action from a user and an electrical signal generator for generating an electrical trigger signal according to the operation action received; and a R, L, GND and MIC 4-pole earphone cable, having a first end having an earphone connector passing through a transmission hole of the user operation end and for connecting to a R, L, GND and MIC 4-pole earphone jack of the mobile terminal, and a second end connected to the controller, and for transmitting the electrical trigger signal to the mobile terminal through the earphone cable, wherein the user operation end comprises a support and a terminal clamp, the support has an upper end and a lower end, the upper end of the support is connected to the terminal clamp, the lower end of the support comprises a handle with a button for receiving the operation action from the user, the terminal clamp comprises a size adjusting and clamping member for clamping and connecting to mobile terminals of difference sizes, and wherein the first end of the cable has a sound input channel of an MIC port and a ground terminal, being connected with the earphone jack of the mobile terminal, and wherein the electrical trigger generator generates the electrical trigger signal based on the voltages of the sound input channel and the ground terminal in order to control the camera connected to the mobile terminal, and wherein when the button is pressed, the sound input channel is shorted to the ground terminal, the voltage of the electrical trigger signal changes from a high level to a low level, which continues until the button is released, and after the button is released, the voltage of the electrical trigger signal returns to the high level.

2. The equipment according to claim 1, wherein the upper end of the support is flexibly connected with the terminal clamp through a universal ball joint, enabling multidirectional adjustment of the terminal clamp.

3. The equipment according to claim 2, wherein the universal ball joint is arranged at the upper end of the support, and a lower end of the terminal clamp is provided with a ball joint seat for receiving the universal ball joint.

4. The equipment according to claim 3, wherein the universal ball joint and the support form an integral structure.

5. The equipment according to claim 1, wherein the support has a gripping part formed at the lower end, and the terminal clamp further comprises a fixing plate with a length defined by a top end and a bottom end, the length of the fixing plate can be adjusted, and an upper fixing arm and a lower fixing arm formed respectively on the top end and on the bottom end.

6. The equipment according to claim 5, wherein the fixing plate further comprises a front end face, the upper fixing arm further comprises a lower end face, and the lower fixing arm further comprises an upper end face, each of the front end face, the lower end face, and upper end face is attached to a flexible backing plate.

7. The equipment according to claim 6, wherein a convex lens is disposed in front of the lower fixing arm or on back of the fixing plate.

8. The equipment according to claim 1, wherein the support comprises a charging power control module, the charging power control module further comprises:
a power unit for providing power for the mobile terminal;
a power management unit coupled to the power unit for controlling charging and discharging for the power unit; and
a terminal charging unit coupled to the power management unit for charging for the mobile terminal.

9. The equipment according to claim 1, wherein the support is provided with a telescopic structure.

10. A method for controlling a camera connected to a mobile terminal designed for a R, L, GND and MIC 4-pole earphone through an equipment, the method comprising:
generating, by the equipment, an electrical trigger signal according to an operation action from a user;
transmitting, by the equipment, the electrical trigger signal to the mobile terminal; and
sending a camera-adjusting signal, by the equipment, to the camera according to the control digital signal, wherein the equipment comprises a controller having a user operation end for receiving an operation action from the user; and an electrical signal generator for generating the electrical trigger signal according to the operation action, wherein the user operation end comprises a support and a terminal clamp, an upper end of the support is connected with the terminal clamp, an lower end of the support comprises a handle with a button arranged for receiving the operation action from the user, and wherein the terminal clamp comprises an adjustable clamping member for clamping mobile terminals of difference sizes, wherein the equipment further comprises a R, L, GND and MIC 4-pole earphone cable, having a first end having an earphone connector passing through a transmission hole of the user operation end and for connecting to a R, L, GND and MIC 4-pole earphone jack of the mobile terminal, and a second end connected to the controller, and for transmitting the electrical trigger signal to the mobile terminal through the earphone cable, and wherein the first end of the cable has a sound input channel of an MIC port and a ground terminal, being connected with the earphone jack of the mobile terminal, and wherein the electrical signal generator generates the electrical trigger signal based on the voltages of the sound input channel and the ground terminal in order to control the camera connected to the mobile terminal, and wherein when the button is pressed, the sound input channel is shorted to the ground terminal, the voltage of the electrical trigger signal changes from a high level to a low level, which continues until the button is released, and after the button is released, the voltage of the electrical trigger signal returns to the high level.

11. A camera controlling apparatus, comprising:
a telescopic support rod, the telescopic support rod having a hollow body and a electrical signal generator disposed inside;
a terminal clamp, for holding a mobile device designed for a R, L, GND and MIC 4-pole earphone, mounted on the telescopic support rod;
a trigger device, mounted on the telescopic support rod and connected to the electrical signal generator; and
a R, L, GND and MIC 4-pole earphone cable disposed inside and extending through the hollow body of the telescopic support rod, the cable having a first end for connecting to the mobile device held by the terminal clamp and a second end connected to the telescopic support rod, and for transmitting a control analog signal to the mobile device through the cable, wherein the first end of the cable has a sound input channel of an MIC port and a ground terminal, being connected with a R, L, GND and MIC 4-pole earphone jack of the mobile device, and wherein the electrical signal generator generates the control analog signal based on the voltages of the sound input channel and the ground terminal in order to control the camera mounted on the mobile device, wherein the trigger device mounted on the telescopic support rod is a reset key, the reset key controls the control analog signal for controlling the camera mounted on the mobile device, wherein the reset key is pressed, the sound input channel is shorted to the ground terminal, the voltage of the electrical trigger signal changes from a high level to a low level, which continues until the reset key is released, and after the reset key is released, the voltage of the electrical trigger signal returns to the high level.

12. The camera controlling apparatus according to claim 11, wherein the terminal clamp comprises a fixing plate with a length defined by a top end and a bottom end, an upper fixing arm and a lower fixing arm formed respectively on the top end and on the bottom end, and wherein the length of the fixing plate can be adjusted.

13. The camera controlling apparatus according to claim 11, wherein the camera controlling apparatus further comprises an micro control unit to control an output indication unit for indicating the photo taking condition, the operation of the trigger device is firstly identified by the micro control unit, then the control analog signal is transmitted to the earphone jack of the mobile device, and wherein the micro control unit generates control analog signals at different frequencies to the earphone jack of the mobile device according to different conditions.

* * * * *